United States Patent
Sunagare

(10) Patent No.: US 10,965,882 B2
(45) Date of Patent: Mar. 30, 2021

(54) VIDEO DISPLAY APPARATUS, VIDEO DISPLAY METHOD, AND VIDEO SIGNAL PROCESSING APPARATUS

(71) Applicant: NEC Display Solutions, Ltd., Tokyo (JP)

(72) Inventor: Hiroshi Sunagare, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 16/964,119

(22) PCT Filed: Feb. 16, 2018

(86) PCT No.: PCT/JP2018/005388
§ 371 (c)(1),
(2) Date: Jul. 22, 2020

(87) PCT Pub. No.: WO2019/159308
PCT Pub. Date: Aug. 22, 2019

(65) Prior Publication Data
US 2021/0037192 A1 Feb. 4, 2021

(51) Int. Cl.
*H04N 5/265* (2006.01)

(52) U.S. Cl.
CPC .................. *H04N 5/265* (2013.01)

(58) Field of Classification Search
CPC ........ H04N 5/265; H04N 5/268; H04N 9/641; H04N 9/64; H04N 5/262; H04N 9/67; H04N 9/76; H04N 7/035
USPC ....... 348/659, 584, 590, 465, 598, 599, 660, 348/705, 706; 382/171, 173
See application file for complete search history.

(56) References Cited

U.S. PATENT DOCUMENTS

2014/0198255 A1* 7/2014 Kegasawa ................ H04N 5/91
348/571

FOREIGN PATENT DOCUMENTS

| JP | 2003-299046 A | 10/2003 |
| JP | 2007-088836 A | 4/2007 |
| JP | 2015-096920 A | 5/2015 |

(Continued)

OTHER PUBLICATIONS

International Search Report (ISR) (PCT Form PCT/ISA/210), in PCT/JP2018/005388, dated May 15, 2018.

*Primary Examiner* — Sherrie Hsia
(74) *Attorney, Agent, or Firm* — McGinn IP Law Group, PLLC

(57) ABSTRACT

A video display apparatus includes: an inputter that receives an input of divided video signals representing divided images obtained by dividing an output image and acquires signal information for each of the divided video signals; a video signal processor that applies processing to the divided video signals and generates an output video signal representing an image obtained by combining the divided images; a controller that acquires the signal information from the inputter and supplies a control signal relating to the processing to the video signal processor; and a display that displays the image represented by the output video signal, and the number of kinds of signal information acquired by the controller with respect to some divided video signals among the divided video signals is greater than the number of kinds of signal information acquired by the controller with respect to the other divided video signals.

11 Claims, 4 Drawing Sheets

(56) References Cited

FOREIGN PATENT DOCUMENTS

JP 2018-019284 A 2/2018

\* cited by examiner

VIDEO DISPLAY APPARATUS, VIDEO DISPLAY METHOD, AND VIDEO SIGNAL PROCESSING APPARATUS

TECHNICAL FIELD

The present invention relates to a video display apparatus, a video display method, and a video signal processing apparatus.

BACKGROUND ART

Patent Document 1 discloses a structure in which a plurality of image processing apparatuses perform parallel processing on 2K1K images that have been obtained by dividing a 4K2K image. The image processing apparatuses disclosed in Patent Document 1 perform input processes of a 4K2K image in parallel by taking advantage of a period in which no processes are performed in the image processing apparatuses. Here, a 4K2K image is an image having a resolution of approximately 4000 pixels×2000 pixels, for example, 3840×2160. Moreover, a 2K1K image is an image having a resolution of approximately 2000 pixels×1000 pixels, for example, 1920×1080.

PRIOR ART DOCUMENT

Patent Document

Patent Document 1: Japanese Unexamined Patent Application, First Publication No. 2015-96920

SUMMARY OF THE INVENTION

Problems to be Solved by the Invention

In the above-described structure, which performs the processes on the divided images that have been obtained by dividing a high-resolution image in parallel, for example, a single central processing unit (CPU) may execute monitoring as to whether or not video signals that represent the divided images are input and monitoring of information that represents the format and so forth of the video signals. Moreover, a video signal that conveys 4K2K images or 2K1K images may include various pieces of information that indicate synchronization signals, an H frequency (a horizontal frequency), a V frequency (a vertical frequency), interlace information, RGB/chrominance information, and so forth, for each vertical scanning period. In this case, when the V frequency of video signals is, for example, 50 Hz, the respective pieces of information are transmitted every 20 ms. In this case, for example, the CPU iteratively executes a process of monitoring a plurality of video signals on which parallel processing is to be performed on a 20 ms cycle. For example, when an on-screen display (hereinafter referred to as "an OSD") in accordance with an operation by a user using a remote controller or the like is performed under control of the CPU, there is a problem in that a response of the OSD to the operation by the user becomes slow when the load on the CPU is high. As such, there is a problem in that the load on the CPU may be excessive when a plurality of video signals that are input in parallel are monitored.

The present invention has been made in view of the above circumstances, and an example object of the present invention is to provide a video display apparatus, a video display method, and a video signal processing apparatus that are capable of solving the above problems.

Means for Solving the Problems

In order to solve the above problems, an example aspect of the present invention is a video display apparatus that includes: an input unit that receives an input of a plurality of divided video signals representing a plurality of divided images obtained by dividing an output image and acquires signal information for each of the divided video signals; a video signal processing unit that applies processing to the plurality of divided video signals and generates an output video signal representing an image obtained by combining the divided images; a control unit that acquires the signal information from the input unit and supplies a control signal relating to the processing to the video signal processing unit; and a display unit that displays the image represented by the output video signal, and the number of kinds of signal information acquired by the control unit with respect to some divided video signals among the plurality of divided video signals is greater than the number of kinds of signal information acquired by the control unit with respect to the other divided video signals.

Moreover, an example aspect of the present invention is a video display method that includes: inputting a plurality of divided video signals representing a plurality of divided images obtained by dividing an output image to an input unit; acquiring, by the input unit, signal information for each of the divided video signals; acquiring, by a control unit, the signal information from the input unit for each of the divided video signals; applying processing to the plurality of divided video signals; generating an output video signal representing an image obtained by combining the divided images; and displaying an image represented by the output video signal, and the number of kinds of signal information acquired by the control unit with respect to some divided video signals among the plurality of divided video signals is greater than the number of kinds of signal information acquired by the control unit with respect to the other divided video signals.

Furthermore, an example aspect of the present invention is a video signal processing apparatus that includes: an input unit that receives an input of a plurality of divided video signals representing a plurality of divided images obtained by dividing an output image and acquires signal information for each of the divided video signals; a video signal processing unit that applies processing to the plurality of divided video signals and generates an output video signal representing an image obtained by combining the divided images; and a control unit that acquires the signal information from the input unit and supplies a control signal relating to the processing to the video signal processing unit, and the number of kinds of signal information acquired by the control unit with respect to some divided video signals among the plurality of divided video signals is greater than the number of kinds of signal information acquired by the control unit with respect to the other divided video signals.

Example Advantages of the Invention

With the example aspects of the present invention, it is possible to reduce the load on the control unit, which monitors the plurality of divided video signals.

MODES FOR CARRYING OUT THE INVENTION

Figure 1:
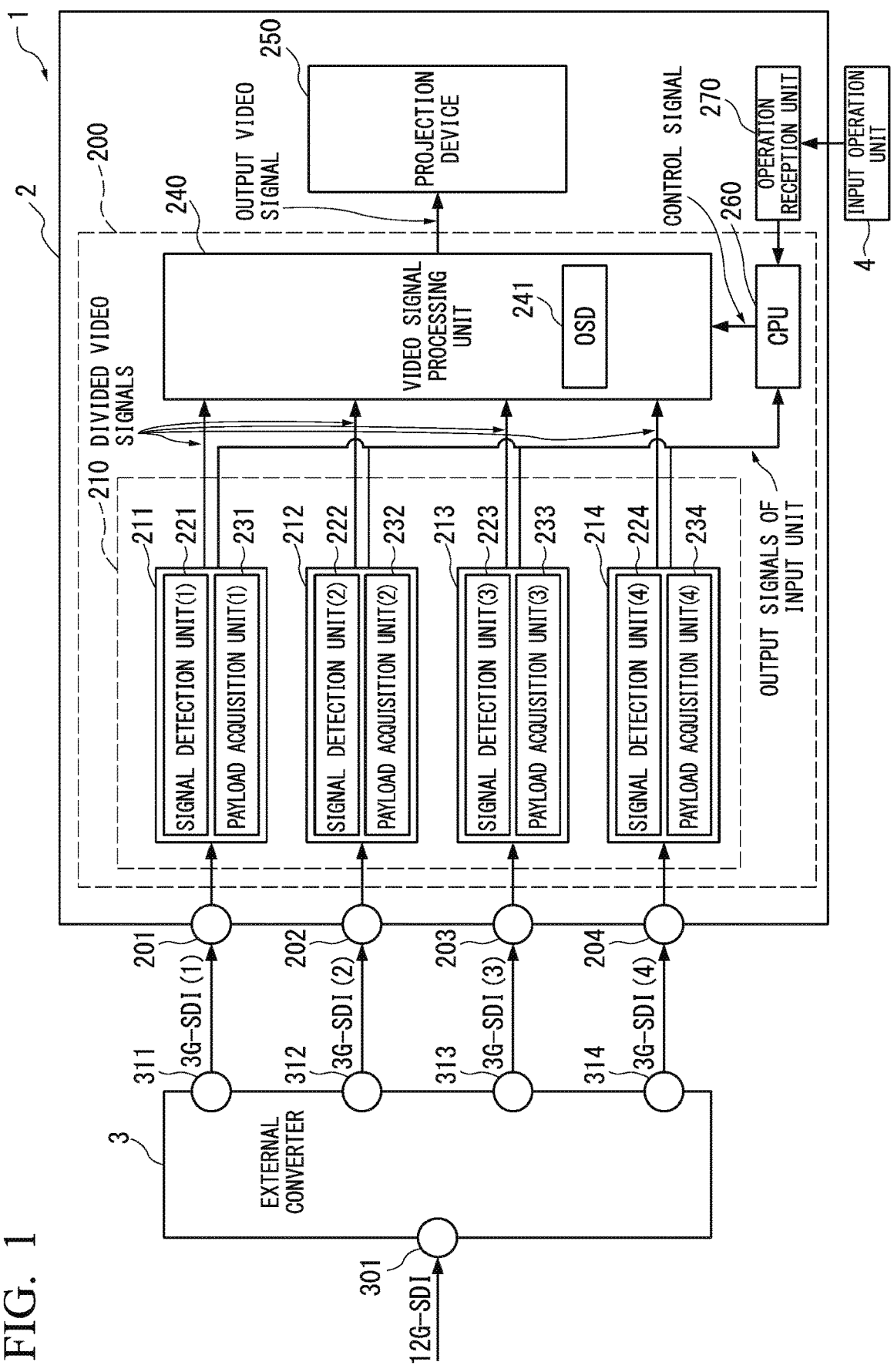
FIG. 1 is a system diagram showing an example of the structure of a video display system in accordance with an example embodiment of the present invention.
Figure 2:
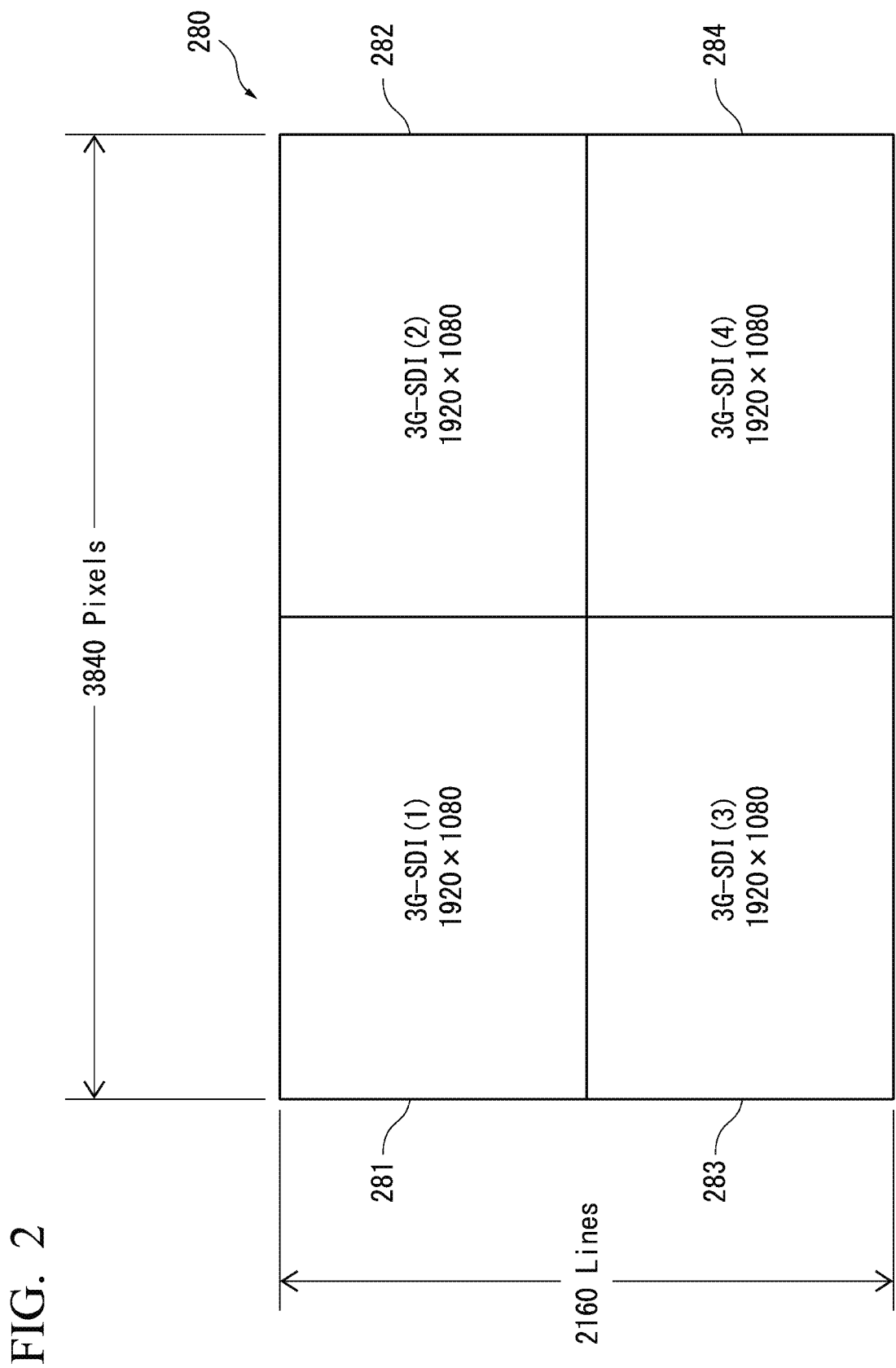
FIG. 2 is a schematic diagram showing an example of an image to be processed by the video display system 1 shown in FIG. 1.

Hereinbelow, example embodiments of the present invention will be described with reference to the drawings. FIG. 1 is a system diagram showing an example of the structure of a video display system 1 in accordance with an example embodiment of the present invention. FIG. 2 is a schematic diagram showing an example of an image to be processed by the video display system 1 shown in FIG. 1. The video display system 1 shown in FIG. 1 is provided with a projector 2, an external converter 3, and an input operation unit 4. The projector 2 is provided with a video signal processing apparatus 200, input terminals 201 to 204, a projection device 250, and an operation reception unit 270. The video signal processing apparatus 200 is provided with an input unit 210, a video signal processing unit 240, and a CPU 260. The CPU 260 can be configured with, for example, a microcomputer. Moreover, the input unit 210, the video signal processing unit 240, and so forth can be configured with, for example, field programmable gate arrays (FPGAs).

The external converter 3 includes one input terminal 301 and four output terminals 311 to 314, converts a 12G-SDI signal input from the input terminal 301 into four 3G-SDI signals (1) to (4), and outputs the four 3G-SDI signals (1) to (4) from the four output terminals 311 to 314. A 12G-SDI signal and a 3G-SDI signal are signals that are compliant to a 12G-serial digital interface (SDI) and a 3G-SDI, respectively, which are video signal transmission standards formulated by the Society of Motion Picture and Television Engineers (SMPTE). The transmission rate of a 12G-SDI signal is approximately 12 G bits per second and it is possible to transmit, for example, 4K2K (3840×2160) video signals using a 12G-SDI signal without compressing the video signals. The transmission rate of a 3G-SDI signal is approximately 3G bits per second and it is possible to transmit, for example, 2K1K (1920×1080) video signals using a 3G-SDI signal without compressing the video signals. The external converter 3 receives an input of the 12G-SDI signal, which represents, for example, an image 280 (an output image) of 3840 pixels×2160 lines as shown in FIG. 2, from the input terminal 301. Then, the external converter 3 converts the 12G-SDI signal into the 3G-SDI signals (1) to (4), which represent images 281 to 284 (hereinafter referred to as "divided images 281 to 284") obtained by dividing the image 280 into four as shown in FIG. 2, and outputs the 3G-SDI signals (1) to (4) in parallel from the output terminals 311 to 314. The 3G-SDI signals (1) to (4) output in parallel from the output terminal 311 to 314 are input to the input terminals 201 to 204 through four video cables.

The 3G-SDI signals (1) to (4) input to the input terminals 201 to 204 are respectively input to input circuits 211 to 214 of the input unit 210. Moreover, the 3G-SDI signals (1) to (4) input to the input terminals 201 to 204 are input to the video signal processing unit 240 in parallel as four divided video signals through the input circuits 211 to 214 or without passing through the input circuits 211 to 214. The divided video signals input to the video signal processing unit 240 are the same as the 3G-SDI signals (1) to (4) input to the input terminals 201 to 204.

The input unit 210 is provided with the input circuits 211 to 214. The input circuit 211 is provided with a signal detection unit (1) 221 and a payload acquisition unit (1) 231. The input circuit 212 is provided with a signal detection unit (2) 222 and a payload acquisition unit (2) 232. The input circuit 213 is provided with a signal detection unit (3) 223 and a payload acquisition unit (3) 233. The input circuit 214 is provided with a signal detection unit (4) 224 and a payload acquisition unit (4) 234. The input unit 210 receives inputs of the 3G-SDI signals (1) to (4), which have been input to the input terminals 201 to 204. Then, the input unit 210 generates predetermined signal information using the signal detection units (1) 221 to (4) 224 and the payload acquisition units (1) 231 to (4) 234 on the basis of the input 3G-SDI signals (1) to (4) and outputs the predetermined signal information.

It is to be noted that signal information in the present example embodiment is configured by a plurality of kinds of signal information to be described below. Signal information is, for example, information that is used when the video signal processing unit 240 performs processing, and signal information includes a plurality of kinds of signal information that indicate the kinds, formats, and contents of the 3G-SDI signals (1) to (4), one kind of signal information representing the presence or absence of each of the signals, and so forth. Moreover, for example, signal information is used by the CPU 260 as information for determining whether or not a signal is supported by the projector 2. The input unit 210 uses, for example, the signal detection units (1) 221 to (4) 224 to detect the presence or absence of each of the 3G-SDI signals (1) to (4) in, for example, a physical layer level for each of the 3G-SDI signals (1) to (4). The input unit 210 generates and outputs a plurality of kinds of signal information representing the presence or absence of each of the 3G-SDI signals (1) to (4) on the basis of the detection result of the presence or absence of each of the 3G-SDI signals (1) to (4). Alternatively, the input unit 210 uses the signal detection units (1) 221 to (4) 224 and the payload acquisition units (1) 231 to (4) 234 to acquire and output a predetermined kind of signal information included in the 3G-SDI signals (1) to (4) in each vertical scanning cycle (a predetermined cycle) for each of the 3G-SDI signals (1) to (4).

The signal detection units (1) 221 to (4) 224 detect, for example, the presence or absence of synchronization, H/V frequencies, and interlace information on the basis of the 3G-SDI signals (1) to (4). The signal detection units (1) 221 to (4) 224 generate and output, for example, one kind of signal information representing the presence or absence of synchronization, one kind of signal information representing H/V frequencies, and one kind of signal information representing interlace information. The payload acquisition units (1) 231 to (4) 234 acquire payload information (RGB/chrominance information, Quad Link presence/absence information, and so forth), which is information included in the 3G-SDI signals (1) to (4) and is information of a video source. The Quad Link presence/absence information is information that indicates "presence" when one video is displayed using the four 3G-SDI signals (1) to (4), and the Quad Link presence/absence information is set by, for example, the external converter 3. The payload acquisition units (1) 231 to (4) 234 generate and output, for example, one kind of signal information representing the RGB/ chrominance information and one kind of signal information representing the Quad Link presence/absence information. It is to be noted that the input circuits 211 to 214 and the payload acquisition units (1) 231 to (4) 234 may iteratively output one or a plurality of kinds of signal information generated on the basis of the 3G-SDI signals (1) to (4) on a predetermined cycle, or they may output the one or the plurality of kinds of signal information in response to a request from the CPU 260.

It is to be noted that in the SMPTE 352 standard, each data stream of a virtual interface conveys a payload ID (a payload identification code), which includes the following pieces of information. That is, the payload ID includes, for example, information indicating the format of a payload, information indicating whether a scanning method is interlaced or progressive, and information indicating the rate of an image, an aspect ratio, a color space, a bit depth, a channel number of a multi-link interface, and so forth. Here, for example, the information indicating the format of a payload indicates information indicating whether an SDI signal is a 3G-SDI signal or a 12G-SDI signal, information indicating whether a link is a single link, a dual link, or a quad link, the number of the vertical lines, and so forth. The payload acquisition units (1) 231 to (4) 234 can generate the above-described kinds of signal information on the basis of, for example, the content of the payload ID The video signal processing unit 240 receives inputs of the 3G-SDI signals (1) to (4) (the divided video signals) in parallel, applies predetermined processing thereto, combines the divided images, and generates and outputs an output video signal to be displayed on the projection device 250. That is, the output video signal is a video signal obtained by combining the divided images 281 to 284 based on the 3G-SDI signals (1) to (4) shown in FIG. 2 into the image 280, which is to be displayed on the projection device 250. Moreover, the predetermined processing is, for example, a process of combining video signals, an adjustment of the image quality that conforms to the characteristics of the projection device 250 and/or a setting by a user, and so forth. Furthermore, when the output video signal is converted into a signal having a format other than that of a 3G-SDI signal, the predetermined processing includes such a conversion process. For example, the processing content and so forth of the predetermined processing are controlled by a predetermined control signal input from the CPU 260. Moreover, the video signal processing unit 240 includes an OSD (function) 241 and generates the output video signal on the basis of the predetermined control signal input from the CPU 260 so that the output video signal includes an image for an on-screen display in accordance with an input operation by a user.

The projection device 25 is, for example, a liquid crystal panel, transmits light emitted by a light source (not shown in the drawings), and displays an image based on the output video signal on an external screen or the like.

The CPU 260 processes a basic operation of the projector 2. In the present example embodiment, for example, the CPU 260 supplies a predetermined control signal (e.g., a setting signal of the processing content) relating to, for example, a process of generating the output video signal, to the video signal processing unit 240. Moreover, the CPU 260 thins out predetermined signal information from the input unit 210 and acquires signal information from the input unit 210. Here, thinning out and acquiring the signal information means that, for example, the CPU 260 acquires a plurality of kinds of signal information for only some of the 3G-SDI signals (1) to (4) (e.g., one of the 3G-SDI signals (1) to (4)) and acquires, for the remainder of the 3G-SDI signals (1) to (4), smaller number of kinds of signal information than the plurality of kinds of signal information acquired for some of the 3G-SDI signals (1) to (4). For example, the CPU 260 acquires a plurality of kinds of signal information for the 3G-SDI signal (1) and acquires only one kind of signal information indicating, for example, the presence or absence of a signal for each of the other 3G-SDI signals (2) to (4). Alternatively, thinning out and acquiring the information means that the CPU 260 acquires, for a plurality of vertical scanning periods (e.g., every other vertical scanning period), signal information that the input unit 210 generates and outputs every vertical scanning period for the 3G-SDI signals (1) to (4). Moreover, the CPU 260 supplies a predetermined control signal to the video signal processing unit 240 to control the video signal processing unit 240 in such a way that the output video signal is generated on the basis of the result indicating the presence or absence of each of the 3G-SDI signals (1) to (4) that have been detected by the input unit 210 so that the divided image corresponding to a 3G-SDI signal of which absence has been detected is not displayed. If a divided image is not displayed, for example, a predetermined still image or a predetermined video can be displayed in a display area for the divided image, or muting of a display, in which nothing is displayed, can be performed. Moreover, the CPU 260 supplies a predetermined control signal to the video signal processing unit 240 to control the video signal processing unit 240 so that an output video signal including an image for an on-screen display in accordance with an input operation by a user is generated. Moreover, the CPU 260 can output a control signal to the video signal processing unit 240 as follows so that the video signal processing unit 240 applies predetermined processing to the divided video signal on the basis of the acquired signal information. For example, the CPU 260 refers to the interlace information, which is one kind of signal information among the plurality of kinds of signal information, outputs a control signal so that an interlaced/progressive (I/P) conversion is performed on the divided video signal in the case of "interlaced", and outputs a control signal so that an I/P conversion is not performed on the divided video signal in the case of "non-interlaced". Alternatively, for example, the CPU 260 refers to the RGB chrominance information, which is another kind of signal information among the plurality of kinds of signal information, outputs a control signal so that no conversion is performed on the divided video signal in the case of an RGB signal, and outputs a control signal so that the divided video signal is converted into RGB in the case of a chrominance signal.

It is to be noted that the CPU 260 can select some of the 3G-SDI signals (1) to (4) as signal information to be acquired from the input unit 210 in accordance with a selection instruction by a user. Moreover, if the predetermined signal information that has been acquired after the thinning out does not satisfy a predetermined condition, the CPU 260 can supply a predetermined control signal to the video signal processing unit 240 to control the video signal processing unit 240 so that a display based on the output video signal is not performed (the display is muted). A case in which the predetermined signal information does not satisfy the predetermined condition is for example, a case in which a 3G-SDI signal is not a signal supported by the projector 2, a case in which a 3G-SDI signal has a format that cannot be processed by the video signal processing unit 240, and so forth.

The operation reception unit 270 is configured to accept operations on the input operation unit 4 by a user, and it is a unit provided in a body that detects key operations or a light receiving unit provided in a body for a remote controller. The input operation unit 4 is main keys or a remote controller, and the operation reception unit 270 detects input operations by a user in the input operation unit 4, that is, depressing of main keys or key operations in a remote controller.

In the video display system 1 of the above structure shown in FIG. 1, after a 12G-SDI signal, which is a video signal having a resolution of, for example, (3840×2160), output from an output apparatus (a signal source) of video signals, which is not shown in the drawings, is input to the input terminal 301 of the external converter 3, the external converter 3 converts the 12G-SDI signal into four 3G-SDI signals (1) to (4), which are video signals having a resolution of (1920×1080), and outputs the four 3G-SDI signals (1) to (4) from the output terminals 311 to 314. It is to be noted that since the four 3G-SDI signals (1) to (4) output from the external converter 3 are output from the same device, for example, it is unlikely that some of the output signals become unstable. The four 3G-SDI signals (1) to (4) having a resolution of (1920×1080) output from the external converter 3 are input to the input terminals 201 to 204 for the 3G-SDI signals (1) to (4) of the projector 2 through the video cables. The projector 2 uses the projection device 250 to display the image 280, which is obtained by combining the divided images 281 to 284 based on the 3G-SDI signals (1) to (4) as shown in FIG. 2 using the video signal processing apparatus 200. It is to be noted that the CPU 260 can acquire the value of a master terminal setting that indicates a master terminal set in accordance with an operation by a user using the input operation unit 4, such as a remote controller, the operation reception unit 270, and the OSD 241. The master terminal setting is setting information that designates a signal among the 3G-SDI signals (1) to (4), which are four input signals, from which the presence or absence of synchronization, the H/V frequencies, and the interlace information, which are detected by the signal detection units (1) 221 to (4) 224, the payload information, which includes the RGB/chrominance information and is acquired by the payload acquisition units (1) 231 to (4) 234, and so forth should be acquired. As a setting value of the master terminal setting, "1" to "4" are set for the input terminals 201 to 204 and the 3G-SDI signals (1) to (4), respectively. The CPU 260 acquires the master terminal setting using the input operation unit 4, the operation reception unit 270, and the OSD 241 and stores the master terminal setting in a predetermined storage area. The master terminal setting in accordance with this instruction operation by a user will be referred to as a master terminal setting in accordance with a user's setting.

Figure 3:
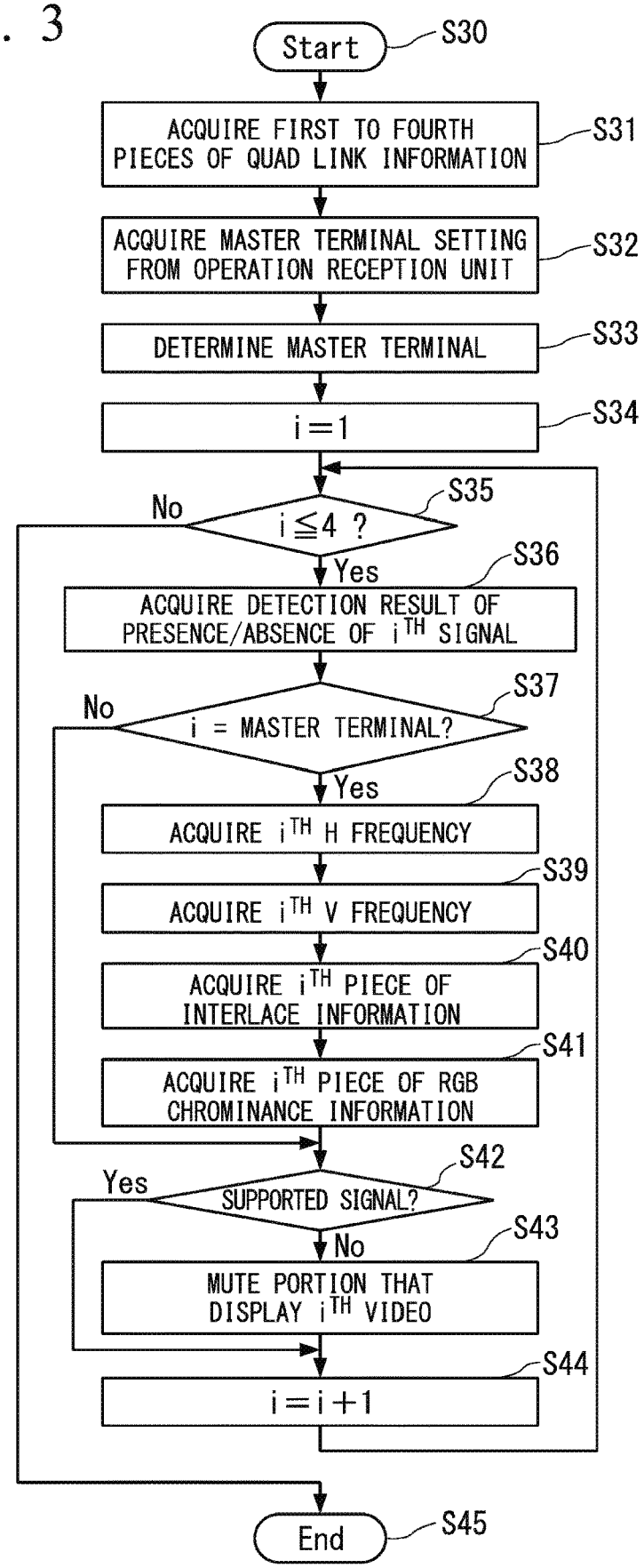
FIG. 3 is a flowchart showing an example of the operation of a video signal processing apparatus 200 shown in FIG. 1.

Next, an example of the operation of the video signal processing apparatus 200 shown in FIG. 1 will be described with reference to FIG. 3. FIG. 3 is a flowchart showing an example of the operation of the video signal processing apparatus 200 shown in FIG. 1. The processing shown in FIG. 3 is performed on a constant cycle (e.g., every 20 ms (=1/the V frequency of a video signal (i.e., 50 Hz))).

When the processing is started (step S30), the CPU 260 sequentially acquires the Quad Link presence/absence information included in the payload information from the input unit 210, that is, at first, acquires the first piece of Quad Link presence/absence information (step S31). If the CPU 260 was able to acquire Quad Link presence/absence information indicating "presence" at step S31, the CPU 260 provisionally sets a terminal (a 3G-SDI signal) for which the Quad Link presence/absence information indicating "presence" was able to be acquired for the first time as a master terminal setting. For example, if the first piece of Quad Link presence/absence information acquired by the CPU 260 indicates "presence", the CPU 260 sets the first terminal as a master terminal and does not acquire the second to fourth pieces of payload information from the input unit 210. It is to be noted that if Quad Link presence/absence information is attached to only one of the outputs of the 3G-SDI signals (1) to (4) output by the external converter 3, the CPU 260 determines the terminal for which Quad Link presence/absence information set as "presence" was able to be acquired as a master terminal setting. However, if Quad Link presence/absence information set as "presence" is also attached for a terminal other than the terminal for which the Quad Link presence/absence information set as "presence" was able to be acquired, the CPU 260 may set the terminal different from the terminal for which the Quad Link presence/absence information set as "presence" was able to be acquired as a master terminal.

Moreover, when the master terminal setting in accordance with the user's setting has been performed, the CPU 260 prioritizes the user's setting on the basis of the master setting value by the user's setting irrespective of the payload information acquired at step S31 and uses the user's setting value acquired using the operation reception unit 270 as a master terminal setting (steps S32 to S33). It is to be noted that if the master terminal setting in accordance with the user's setting has already been acquired, the process of step S31 may be omitted and the CPU 260 may not acquire the first to fourth pieces of Quad Link presence/absence information.

Next, the CPU 260 assigns "1" to a variable i, which is a variable used in the processing (step S34) and acquires the detection result with respect to the presence or absence of the 3G-SDI signal (1) from the $i^{th}$ input circuit (in this case, the first input circuit 211) if the variable i is less than or equal to "4" (in the case of "Yes" at step S35) (step S36).

At step S37, if the variable i is equal to the value of the master terminal setting (in the case of "Yes" at step S37), the CPU 260 acquires the $i^{th}$ H frequency from the $i^{th}$ input circuit (any one of the input circuits 211 to 214) (step S38), acquires the $i^{th}$ V frequency from the $i^{th}$ input circuit (step S39), acquires the $i^{th}$ piece of interlace information from the $i^{th}$ input circuit (step S40), and acquires the $i^{th}$ piece of RGB/chrominance information from the $i^{th}$ input circuit (step 41). The signal information acquired from the input unit 210 by the CPU 260 at steps S38 to S41 is, for example, information that is used for determining whether or not a signal is supported by the projector 2.

Next, if the CPU 260 has determined that a signal is not supported or a signal is not present on the basis of the detection result at step S36 and the signal information acquired at steps S38 to S41 (in the case of "No" at step S42), the CPU 260 mutes (does not display) the $i^{th}$ video (any one of the divided images 281 to 284) (step S43). With this muting of the video, it is possible to prevent the $i^{th}$ video display from becoming an abnormal display (e.g., a noise display).

In contrast, if the $i^{th}$ terminal is not the master terminal (in the case of "No" at step S37), the CPU 260 acquires only the detection result with respect to the presence or absence of the $i^{th}$ 3G-SDI signal (i) (step S36). If the $i^{th}$ terminal is not the master terminal (in the case of "No" at step S37), the CPU 260 does not acquire any signal information that is used for determining whether or not a signal is supported by the projector 2; for example, the CPU 260 does not perform acquisition of the $i^{th}$ H frequency (step S38), acquisition of the $i^{th}$ V frequency (step S39), acquisition of the $i^{th}$ piece of interlace information (step S40), and acquisition of the $i^{th}$ piece of RGB/chrominance information (step S41). Next, if the CPU 260 has determined that the signal of the master terminal is not a supported signal or the signal of the master terminal is not present on the basis of the detection result with respect to the input terminal at step S36 and the signal information acquired at steps S38 to S41 with respect to the master terminal, which is another input terminal (in the case of "No" at step S42), the CPU 260 mutes the $i^{th}$ video (any one of the divided images 281 to 284) (step S43). By muting the $i^{th}$ video, it is possible to prevent display of the $i^{th}$ video from becoming an abnormal display (e.g., a noise display). It is to be noted that if the master terminal is not the first signal, at step S42 and step S43, after it is detected that the signal of the master terminal is not supported in the processing shown in FIG. 3 in the next cycle, the videos corresponding to the signals of the terminals other than the master terminal are muted.

Thereafter, the CPU 260 increments the variable i by one (step S44) and iteratively executes the processes at steps S35 to S44 until the variable i is greater than or equal to "4" (until "No" at step S35). In contrast, if the variable i is greater than "4" (in the case of "No" at step S35), the CPU 260 ends the processing shown in FIG. 3 (step S45).

In the processing shown in FIG. 3, if the 3G-SDI signal (any one of the 3G-SDI signals (1) to (4)) set as a master terminal is not a signal supported by the projector 2, the CPU 260 mutes all the divided images 281 to 284 shown in FIG. 2. Moreover, because the CPU 260 has acquired all the detection results with respect to the presence or absence of the 3G-SDI signals (1) to (4) from the input unit 210, if, for example, a disconnection of a video cable and/or an incorrect connection of a video cable occurs, it is possible to mute a video corresponding to the relevant signal.

Moreover, in the above processing, the CPU 260 does not acquire information that is used for determining whether or not a signal is supported by the projector 2 with respect to the three input terminals other than the master terminal from the input unit 210 (thins out information to be acquired); for example, the CPU 260 does not perform acquisition of an H frequency, acquisition of a V frequency, acquisition of interlace information, and acquisition of RGB/chrominance information. Thus, the number of pieces of information to be acquired is reduced by 60% and the load on the CPU is also reduced.

It is to be noted that from the viewpoint of the instability of a signal/payload and incorrect information, assuming that the degree of impact when the four 3G-SDI signals are input from a single external converter to the projector 2 is "1", the degree of impact when the four 3G-SDI signals are input from different signal sources (e.g., personal computers (PCs) or set-top boxes) becomes four times. Thus, the operation of the video signal processing apparatus 200 may be selected so that the thinning out is performed when a single external converter is connected and the thinning out is not performed when different signal sources are connected.

It is to be noted that the structure shown in FIG. 1 is an example, and, for example, some or all of the input unit 210 and the video signal processing unit 240 may be configured integrally. Moreover, the present example embodiment is not limited to quad links of SDI signals and the present example embodiment may be applied to dual links. Furthermore, an SDI signal may be a signal other than a 3G-SDI and a 12G-SDI. Additionally, a liquid crystal display, an organic electro-luminescence (an organic EL) display, or the like may be used in place of the projection device 250. Moreover, in this case, a multi-display in which a plurality of display panels are combined may be used. Furthermore, in this case, the output video signal output by the video signal processing unit 240 may be configured by a plurality of video signals for the display panels.

Next, another example of the operation (hereinafter referred to as "a second operation example") of the video signal processing apparatus 200 shown in FIG. 1 will be described. In the above operation example (hereinafter referred to as "a first operation example") described with reference to the flowchart shown in FIG. 3, the CPU 260 reduces the number of pieces of information to be acquired by not acquiring the signal information with respect to the terminals other than the master terminal, whereas the second operation example increases an information acquisition interval by the CPU 260. For example, if some of the 3G-SDI signals (1) to (4) are not stable owing to the performance of the external converter 3, it is necessary to acquire information that is used for determining whether or not each of the 3G-SDI signals (1) to (4) is a supported signal with respect to all the 3G-SDI signals (1) to (4). Thus, in the second operation example, for example, when 1/the V frequency (50 Hz) of a video signal is 20 ms, the acquisition interval is set to two cycles (every 40 ms) rather than one cycle, and the time intervals at which the CPU 260 acquires signal information from the input unit 210 (the number of times of acquisition) are increased In this case, by increasing the cycle (40 ms), the number of pieces of information to be acquired per second is reduced to 50% and thus the load on the CPU is also reduced.

It is to be noted that the CPU 260 may acquire signal information for all the 3G-SDI signals (1) to (4) from the input unit 210 every 40 ms, the CPU 260 may sequentially acquire signal information, for example, one piece of signal information for one 3G-SDI signal every 40 ms, and the CPU 260 may sequentially acquire signal information, for example, two pieces of signal information for two 3G-SDI signals every 40 ms. That is, a reduction in the number of signals to be acquired in the first operation example may be appropriately combined with an increase in the acquisition interval in the second operation example.

Figure 4:
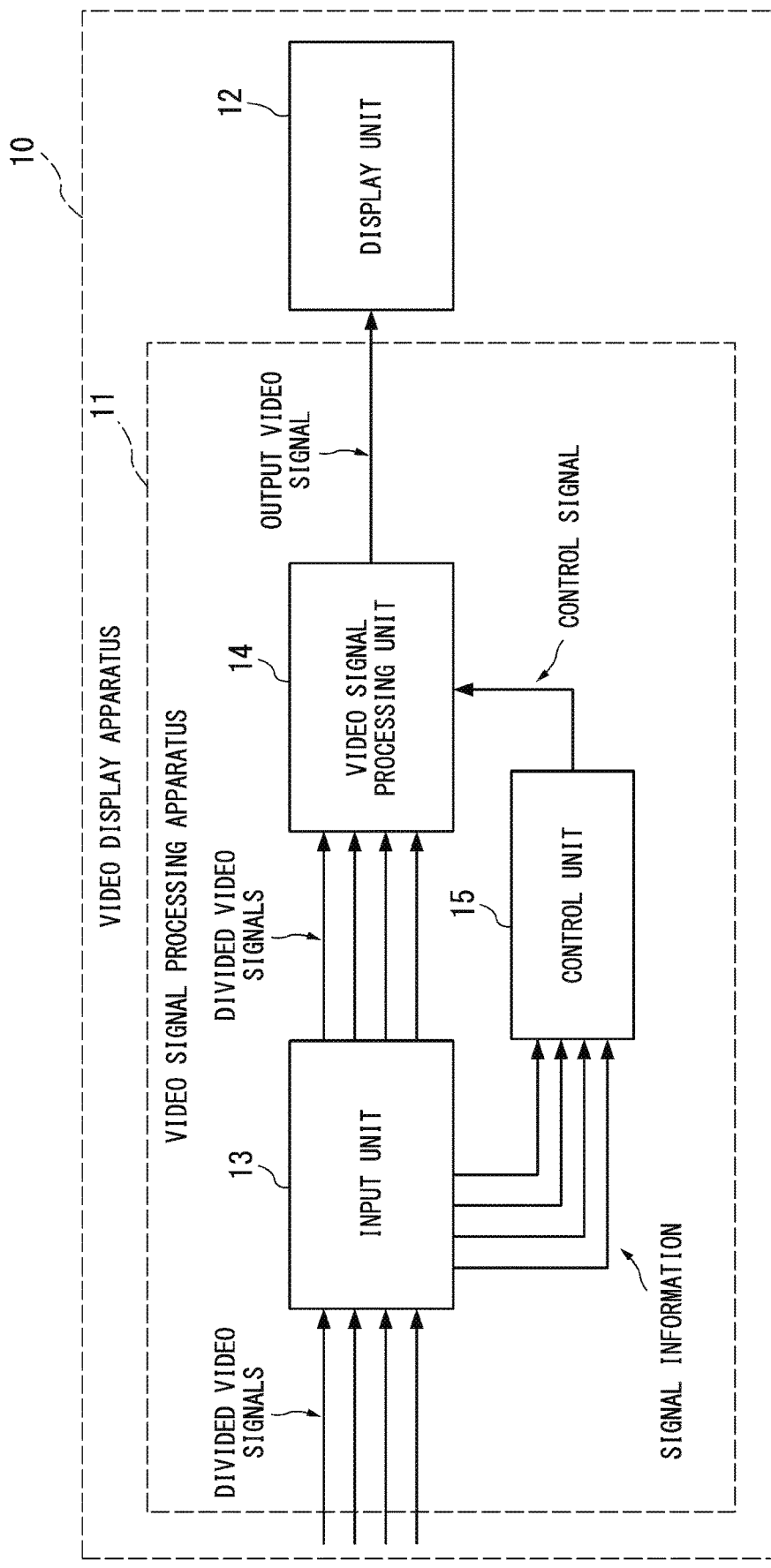
FIG. 4 is a system diagram showing an example of a basic structure of an example embodiment of the present invention.

Next, an example of a basic structure in accordance with an example embodiment of the present invention will be described with reference to FIG. 4. FIG. 4 is a system diagram showing an example of a basic structure in accordance with an example embodiment of the present invention. A video display apparatus 10 shown in FIG. 4 is provided with a video signal processing apparatus 11 and a display unit 12. The video signal processing apparatus 11 is provided with an input unit 13, a video signal processing unit 14, and a control unit 15. A plurality of divided video signals representing a plurality of divided images obtained by dividing an output image are input to the input unit 13, and the input unit 13 acquires signal information for each of the divided video signals. The video signal processing unit 14 applies processing to the plurality of divided video signals and generates an output video signal representing an image obtained by combining the divided images. The control unit 15 acquires the signal information from the input unit 13 and supplies a control signal relating to the processing to the video signal processing unit 14. The display unit 12 displays the image represented by the output video signal. In this structure, the number of kinds of signal information acquired by the control unit 15 with respect to some divided video signals among the plurality of divided video signals is greater than the number of kinds of signal information acquired by the control unit 15 with respect to the other divided video signals.

Here, there are five kinds of signal information acquired by the control unit 15, including signal information representing the presence or absence of a 3G-SDI signal (a divided video signal) (step S36), signal information representing an H frequency (step S38), signal information representing a V frequency (step S39), signal information representing interlace information (step S40), and signal information representing RGB/chrominance information (step S41). Of these pieces of signal information, the signal information acquired by the control unit 15 with respect to some divided video signals (the master) is the above five pieces of signal information, and the number of kinds of signal information is five. In contrast, the signal information acquired by the control unit 15 with respect to the other divided video signals is only the signal information representing the presence or absence of each of the 3G-SDI signals, and the number of kinds of signal information is one.

With the above structure, it is possible to reduce the load on the control unit 15, which monitors the plurality of divided video signals.

It is to be noted that, in the above structure, the number of kinds of signal information acquired by the control unit 15 with respect to the other divided video signals, for which a small number of kinds of signal information are acquired, may be one. Moreover, the signal information acquired by the control unit 15 with respect to the divided video signals for which a small number of kinds of signal information are acquired may be only the signal information representing the presence or absence of a divided video signal. Furthermore, the control unit 15 can output a predetermined control signal to cause the video signal processing unit 14 to generate an output video signal so that a predetermined image is displayed in an area on the display unit 12 that corresponds to a divided video signal of which absence is indicated by signal information. The predetermined image may be a muted image of the video display apparatus 10. Moreover, some of the divided video signals, for which a great number of kinds of signal information are acquired, may be a divided video signal selected on the basis of signal information representing the presence or absence of predetermined information included in payload information of the divided video signals among the signal information acquired by the input unit 13. Moreover, the control unit 15 may select some of the divided video signals, for which a great number of kinds of signal information are acquired, in accordance with a selection instruction by a user. Furthermore, the control unit 15 may acquire the signal information that has been acquired from the divided video signals on a predetermined cycle by the input unit 13, on a cycle that is longer than the predetermined cycle. Additionally, the control unit 15 may supply a control signal to the video signal processing unit 14 to control the video signal processing unit 14 so that an output video signal that includes an image for an on-screen display in accordance with an input operation by a user is generated.

It is to be noted that the correspondence between the structure shown in FIG. 4 and the structure shown in FIG. 1 is as follows. That is, the video display apparatus 10 shown in FIG. 4 corresponds to the projector 2 shown in FIG. 1. The video signal processing apparatus 11 shown in FIG. 4 corresponds to the video signal processing apparatus 20 shown in FIG. 1. The display unit 12 shown in FIG. 4 corresponds to the projection device 250 shown in FIG. 1. The input unit 13 shown in FIG. 4 corresponds to the input unit 210 shown in FIG. 1. The video signal processing unit 14 shown in FIG. 4 corresponds to the video signal processing unit 240 shown in FIG. 1. The control unit 15 shown in FIG. 4 corresponds to the CPU 260 shown in FIG. 1.

Although example embodiments of the present invention have been described above in detail with reference to the drawings, specific structures thereof are not limited to those of the example embodiments, and designs and so forth that do not depart from the gist of the present inventions are also included. It is to be noted that some or all of programs that are executed by computers provided in the video signal processing apparatus 200 and the projector 2 can be distributed via computer-readable recording media or communication lines.

DESCRIPTION OF REFERENCE SIGNS

1 video display system
2 projector
3 external converter
4 input operation unit
10 video display apparatus
11, 200 video signal processing apparatus
12 display unit
13, 210 input unit
14, 240 video signal processing unit
15 control unit
201 to 204 input terminal
211 to 214 input circuit
250 projection device
260 CPU
270 operation reception unit

The invention claimed is:

1. A video display apparatus comprising:
an inputter that receives an input of a plurality of divided video signals representing a plurality of divided images obtained by dividing an output image and acquires signal information for each of the divided video signals;
a video signal processor that applies processing to the plurality of divided video signals and generates an output video signal representing an image obtained by combining the divided images;
a controller that acquires the signal information from the inputter and supplies a control signal relating to the processing to the video signal processor; and
a display that displays the image represented by the output video signal,
wherein the number of kinds of signal information acquired by the controller with respect to some divided video signals among the plurality of divided video signals is greater than the number of kinds of signal information acquired by the controller with respect to the other divided video signals.

2. The video display apparatus according to claim 1, wherein the number of kinds of signal information acquired by the controller with respect to the other divided video signals is one.

3. The video display apparatus according to claim 1, wherein the signal information acquired by the controller with respect to the other divided video signals is only signal information representing presence or absence of each of the divided video signals.

4. The video display apparatus according to claim 1, wherein the controller causes the video signal processor to generate the output video signal so that a predetermined image is displayed in an area on the display that corresponds to a divided video signal of which absence is indicated by the signal information.

5. The video display apparatus according to claim 4, wherein the predetermined image comprises a muted image of the video display apparatus.

6. The video display apparatus according to claim 1, wherein some of the divided video signals comprise divided video signals selected on the basis of signal information representing presence or absence of predetermined information included in payload information of the divided video signals among the signal information acquired by the inputter.

7. The video display apparatus according to claim 1, wherein the controller selects some of the divided video signals in accordance with a selection instruction by a user.

8. The video display apparatus according to claim 1, wherein the controller acquires the signal information that has been acquired from the divided video signals on a predetermined cycle by the inputter, on a cycle that is longer than the predetermined cycle.

9. The video display apparatus according to claim 1, wherein the controller supplies the control signal to control the video signal processor so that the output video signal that includes an image for an on-screen display in accordance with an input operation by a user is generated.

10. A video display method comprising:
inputting a plurality of divided video signals representing a plurality of divided images obtained by dividing an output image to an inputter;
acquiring, by the inputter, signal information for each of the divided video signals;
acquiring, by a controller, the signal information from the inputter for each of the divided video signals;
applying processing to the plurality of divided video signals;
generating an output video signal representing an image obtained by combining the divided images; and
displaying an image represented by the output video signal,
wherein the number of kinds of signal information acquired by the controller with respect to some divided video signals among the plurality of divided video signals is greater than the number of kinds of signal information acquired by the controller with respect to the other divided video signals.

11. A video signal processing apparatus comprising:
an inputter that receives an input of a plurality of divided video signals representing a plurality of divided images obtained by dividing an output image and acquires signal information for each of the divided video signals;
a video signal processor that applies processing to the plurality of divided video signals and generates an output video signal representing an image obtained by combining the divided images; and
a controller that acquires the signal information from the inputter and supplies a control signal relating to the processing to the video signal processor,
wherein the number of kinds of signal information acquired by the controller with respect to some divided video signals among the plurality of divided video signals is greater than the number of kinds of signal information acquired by the controller with respect to the other divided video signals.

* * * * *